Oct. 25, 1960    R. B. WILLIAMSON ET AL    2,957,186
DEVICE USABLE AS CRADLE OR CARRIAGE
Filed Nov. 12, 1957    5 Sheets-Sheet 1
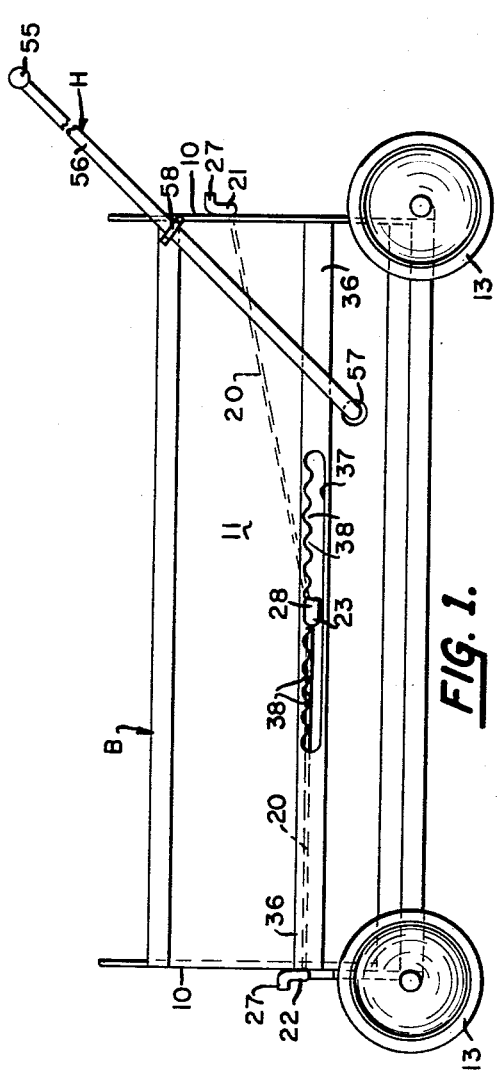
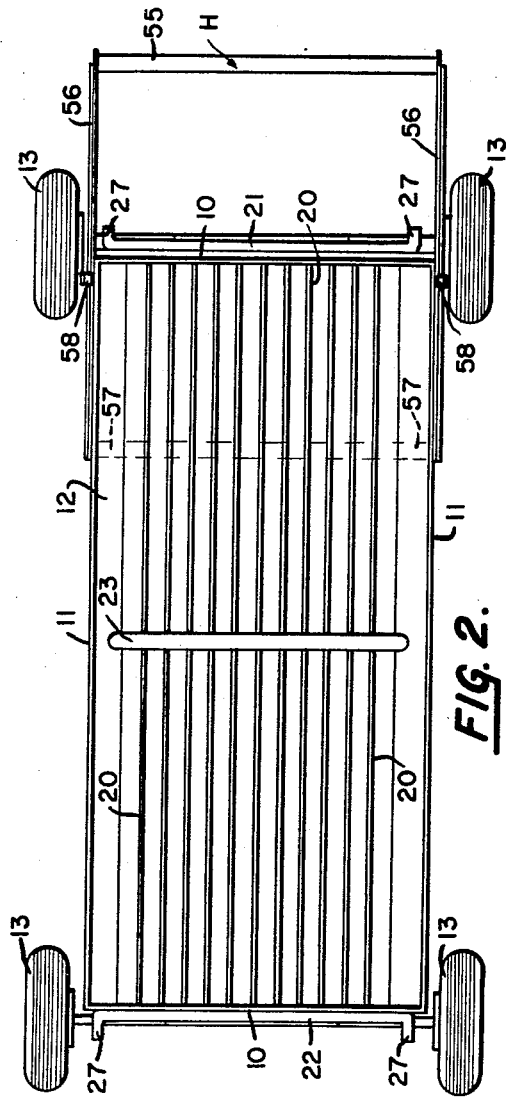
INVENTORS.
RUTH B. WILLIAMSON
BY  GEORGE W. RIENKS
Horace B. Van Valkenburgh
ATTORNEY INVENTORS.
RUTH B. WILLIAMSON
GEORGE W. RIENKS
BY
*Horace B. Van Valkenburgh*
ATTORNEY

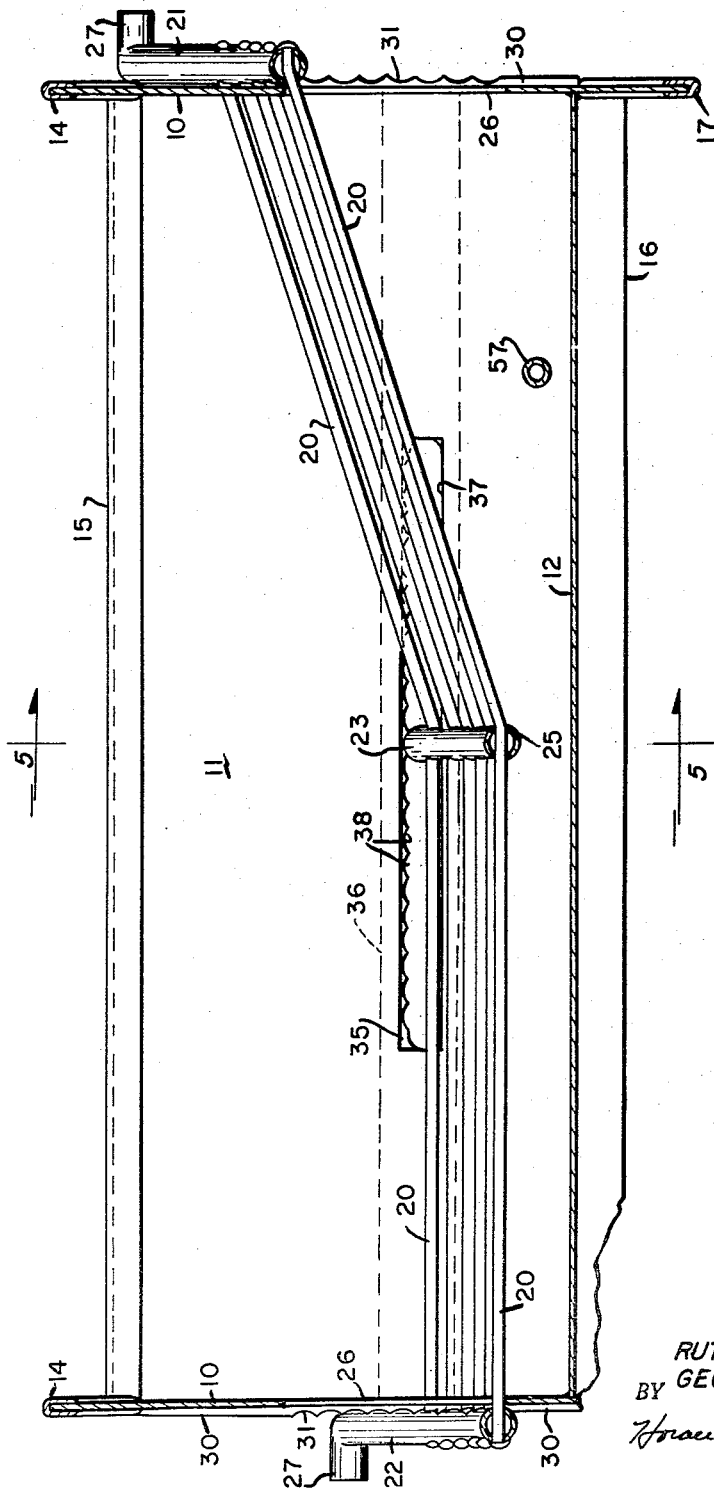

Oct. 25, 1960  R. B. WILLIAMSON ET AL  2,957,186
DEVICE USABLE AS CRADLE OR CARRIAGE
Filed Nov. 12, 1957  5 Sheets-Sheet 4

INVENTORS.
RUTH B. WILLIAMSON
BY GEORGE W. RIENKS

ATTORNEY

Oct. 25, 1960    R. B. WILLIAMSON ET AL    2,957,186
DEVICE USABLE AS CRADLE OR CARRIAGE
Filed Nov. 12, 1957    5 Sheets-Sheet 5
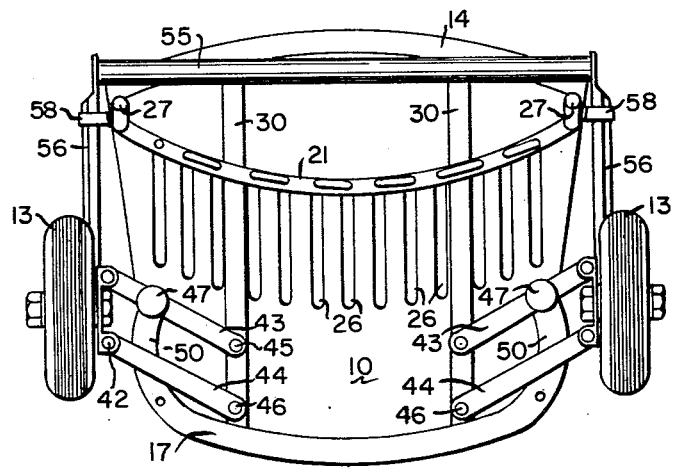
FIG. 8.
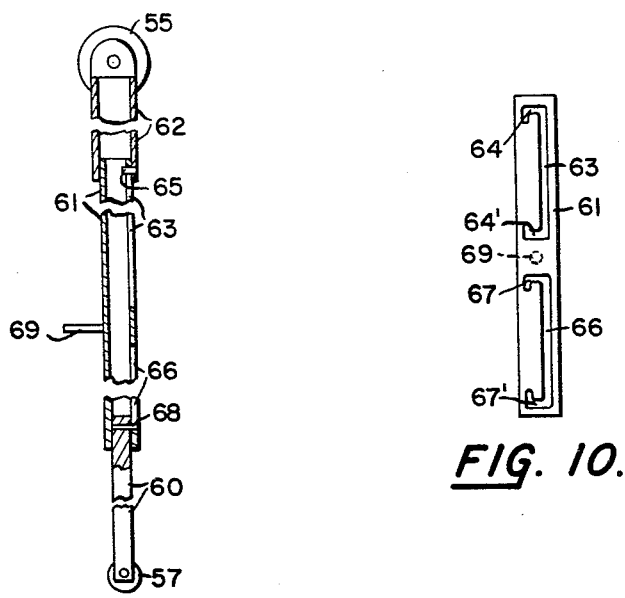
FIG. 9.
FIG. 10.
INVENTORS.
RUTH B. WILLIAMSON
GEORGE W. RIENKS
BY
Horace B. Van Valkenburgh
ATTORNEY United States Patent Office 2,957,186
Patented Oct. 25, 1960

2,957,186

DEVICE USABLE AS CRADLE OR CARRIAGE

Ruth B. Williamson, 19 Sunset Drive, Englewood, Colo., and George W. Rienks, 734 Cook St., Denver, Colo.

Filed Nov. 12, 1957, Ser. No. 695,634

10 Claims. (Cl. 5—101)

This invention relates to a device usable as a cradle or as a carriage and more particularly to such a device which may be converted from a carriage to a cradle and vice versa.

Cradles for infants or babies have been used, probably for centuries, but primarily have been utilized as a place in which the infant can sleep. Also, cradles have been provided with rockers or curved transverse lower edges, so that a rocking motion imparted to the cradle could be used in inducing the infant to sleep. To prevent the cradle from being overturned accidentally, the rockers usually extend laterally some distance beyond the sides of the cradle, while cradles normally stay in one place, being rather difficult to transport or move about. In more recent decades, baby buggies or carriages have come into general use, being provided with wheels, so that the buggy could be moved from place to place on its own wheels. Also, the bottom of the infant receiving portion of the baby buggy has been provided with an adjustable portion, so that the infant can be supported in at least partially sitting position, as to relieve the monotony of the infant lying flat on its back. However, baby buggies are usually relatively large, cumbersome and relatively heavy affairs, which have been satisfactory for individual transportation of the infant, but quite difficult to transport in a passenger automobile, for instance, particularly with the infant therein. While some baby buggies are capable of being folded so as to be placed more readily in the trunk of a passenger automobile, for instance, the infant cannot be contained therein when so folded. Baskets and the like have also been used to contain infants, but while sufficiently light to be moved readily and also not so large but that the same can be placed in a passenger automobile or the like, the baby still must lie relatively flat. Also, baskets cannot be rocked, as in the case of cradles, or used for wheeled transportation, as in the case of baby buggies or carriages. Strollers are also in wide-spread use, these being relatively light and therefore easy to propel, but are provided only with a seat and therefore useful only for larger infants who are able to sit up during the period of transportation. Thus, the infant cannot lie down for resting or sleeping in a conventional stroller.

Among the objects of this invention are to provide a novel device for receiving an infant and adapted to be used as a cradle, carriage or the like; to provide such a device in which, when utilized as a cradle, adequate provision is made to prevent accidental overturning, as during rocking; to provide such a device which is sufficiently light in weight that it may be readily picked up and placed in a vehicle, such as a passenger automobile; to provide such a device which has minimum exterior dimensions, and thus may more readily be placed in a passenger automobile or the like; to provide such a device which may be adjusted so that the infant may lie flat or may recline in at least a partially sitting position; to provide such a device in which the support for the infant may be elevated at either end and the angularity at either end may also be adjusted; to provide such a device in which the infant is resiliently supported; and to provide such a device which avoids undue complications in construction but which is readily manufactured and is effective in use.

Additional objects and the novel features of this invention will become apparent from the description which follows, taken in connection with the accompanying drawings, in which:

Fig. 1 is a side elevation of a device constructed in accordance with this invention, showing the device when used as a carriage or the like for an infant;

Fig. 2 is a top plan view of the device of Fig. 1;

Fig. 4 is a longitudinal section of the body;

Fig. 8 is an end elevation, on a slightly larger scale than Fig. 1, showing the device when utilized as a cradle;

Fig. 9 is a longitudinal section of a telescoping or collapsible side of a handle; and Fig. 10 is a side elevation of one portion of the handle side of Fig. 9.

Figure 3:
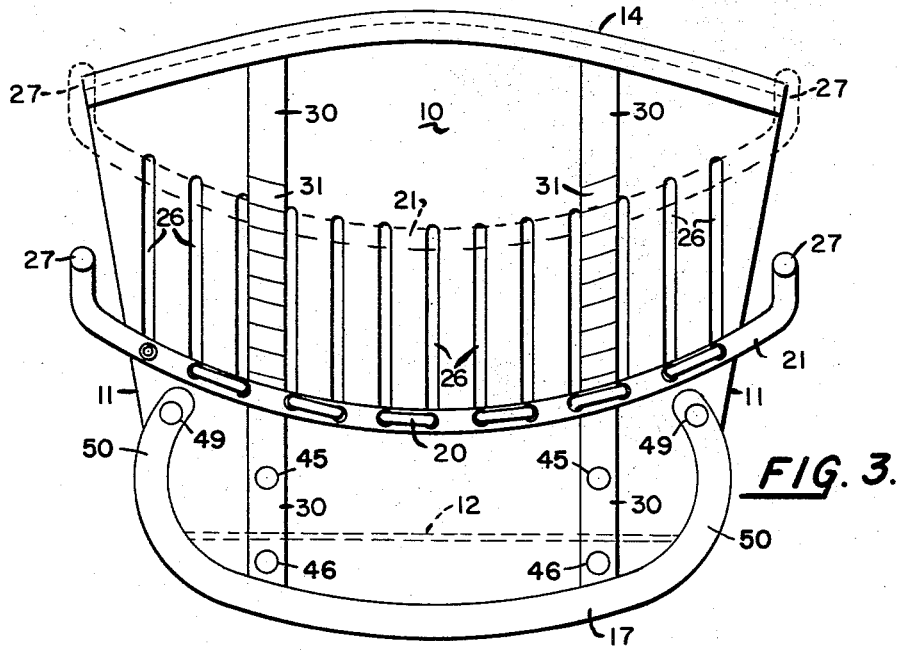
Fig. 3 is an end view of a body of the device of Fig. 1, on a larger scale.

As illustrated in Figs. 1 and 2, a device constructed in accordance with this invention preferably includes a body B, conveniently generally rectangular in shape and provided with ends 10, outwardly slanting sides 11, and a bottom 12, the latter being used primarily for reinforcing purposes and the infant being supported in a manner described later. A series of wheels 13, conveniently rubber-tired, ball bearing wheels, or mounted for rotation in any other suitable manner, are mounted on the respective ends 10 of the body, in a manner described later, so as to be adjustable to different positions, including the position of Fig. 1 for use of the device as a carriage or the like and the position of Fig. 8, for use of the device as a cradle. A handle H extending upwardly at an angle, at one end of the body, permits the body B, when supported by wheels 13, to be moved about in the same manner as a baby buggy or carriage, the handle H being collapsible to the position of Fig. 8, when the device is to be used as a cradle, or when the device is to be placed in a passenger automobile, for instance. The ends 10, sides 11 and bottom 12 are conveniently made of a light weight material, such as aluminum or magnesium or alloys thereof, the upper edges of the ends and sides being reinforced by strips 14 and 15, respectively, as shown also in Figs. 4 and 5. Strips 14 and 15 are conveniently U-shaped, extruded strips and prevent the exposure of any rough or cut edges of the ends 10 and sides 11. The sides 11 may overlap the ends 10, or vice versa, as through a flange which may be riveted or otherwise secured, as by welding, to the respective other part, or the adjacent edges may be beveled for corner welding. The lower edges of the sides 11, as in Figs. 4 and 5, may be reinforced by similar strips 16, while the lower edges of the ends 10 may be reinforced by similar strips 17. It will be noted that the upper edges of the ends 10 are conveniently arcuate in an upward direction while the lower edges of the ends 10 are arcuate in a downward direction and that the strips 17 thus act as rockers and support the body B when the device is used as a cradle. In accordance with this invention, the wheels 13 are moved to the position of Fig. 8, i.e., the dotted position of Fig. 6, when the device is to be used as a cradle, and thereby act as stops to prevent accidental overturning of the cradle. As will be evident, the device, when used as a cradle, may be rocked in a conventional manner, but the position of the wheels 13 is such that the wheels act as stops to engage the floor or other surface on which the device rests, this action of the wheels as stops being an important feature of this invention.

The body B may further be reinforced by the bottom 12, conveniently a rectangular plate of light weight material, such as aluminum, magnesium or the like, attached to the ends and sides of the body B, conveniently just above the position of strips 16. The edges of the bottom 12 may be beveled for welding to the ends 10 and sides 11, or may be attached in any other suitable manner, as by a riveted or welded flange.

In accordance with this invention, the infant is resiliently supported by a series of elongated resilient members, such as rubber or plastic rope, conveniently formed of rubber or neoprene, preferably extending in spaced, parallel relation, longitudinally of the body B. The resilient members 20 may be formed by a single rubber rope which is laced back and forth between an end bar 21 and an opposite end bar 22, engaging or passing through a center bar 23. Thus, one end of the rubber rope may be attached to the end bar 21 and the opposite end of the rubber rope may be attached to the end bar 21 or the end bar 22, depending upon whether an even or an odd number of strands are utilized, each strand passing through holes 24 provided for that purpose in the end bars 21 and 22 and shown in Fig. 6, as well as holes 25 in the center bar 23, shown in Fig. 4. The rope is in tension between the end bars and center bar so that the tension of the rope will hold in position the end bars 21 and 22, which are disposed on the outside of the ends 10. Each end 10 may also be provided, as in Figs. 3 and 5, with a series of slots 26 adapted to accommodate movement of the resilient members 20 when the end bar 21 or 22 is adjusted in position. As in Figs. 3–5, the end bars 21 and 22 and the center bar 23 are conveniently formed of light tubular material, such as aluminum tubing, the end bars 21 and 22, as in Fig. 3, being provided with an upwardly and then longitudinally extending handle portion 27 at each end of the end bar, with an outwardly and longitudinally extending handle portion 28, at each end of the center bar 23. The end bars 21 and 22 and the center bar 23 may be bowed downwardly toward the center, as shown, to provide a hammock effect for greater comfort of the infant.

On the exterior thereof, each end 10 is further reinforced by a pair of ribs 30, extending vertically and provided with slanting notches 31 having an arcuate cross section so as to be engaged by the respective end bar 21 or 22, the end bars being movable between the upper position shown for bar 21 and the lower position shown for bar 22 in Fig. 4, as well as any desired intermediate position.

Figure 5:
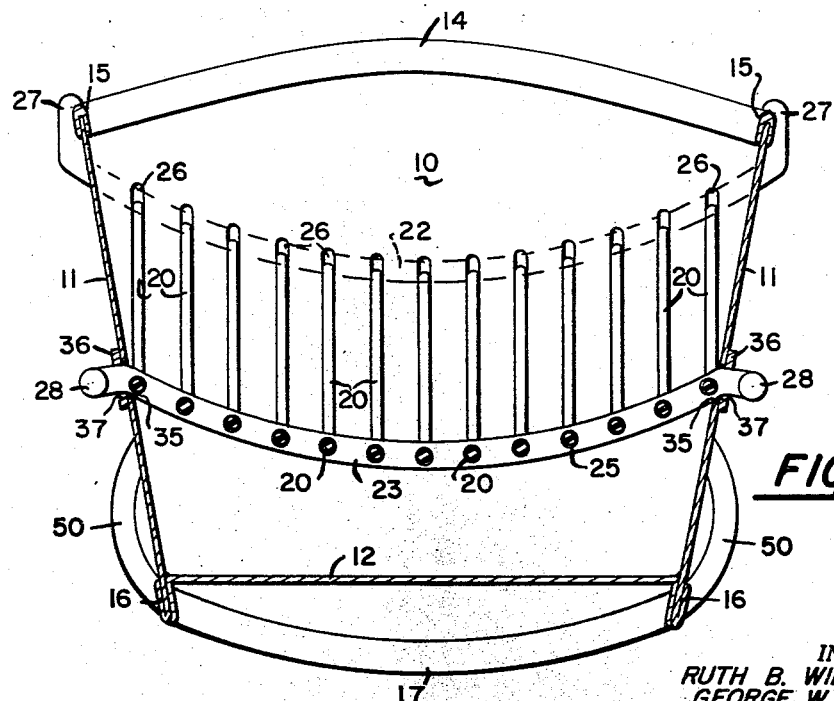
Fig. 5 is a vertical transverse section, taken along line 5—5 of Fig. 4.

In further accordance with this invention, the center bar 23 is longitudinally adjustable, each end thereof extending through a slot 35, as in Figs. 4 and 5, formed in the respective side 11 and on the outside of which is mounted an elongated reinforcing bar 36 having a longitudinal slot 37 therein, the upper edge of which is provided with a series of arcuate notches 38, as in Fig. 4, corresponding in curvature to the portion of the center bar 23 engaged thereby and adapted to hold the center bar 23 in any adjusted position. Particularly when one of the end bars 21 or 22 is moved above the lower position, it will be evident that the tension of the resilient members 20 will hold the center bar 23 in engagement with the particular notch 38, at each side, to which the center bar 23 is adjusted. The tension of the resilient members 20 is preferably such that either end bar 21 or 22 may be adjusted without the necessity for exerting an undue force, either upwardly or downwardly, by grasping the handle portions 27, but still sufficient to prevent either end bar from being dislodged from an adjusted position, due to the weight of the infant and any other articles or objects which may be placed therein with the infant, including a mattress or padding, such as a foam rubber mattress, which is preferably placed on top of the resilient members 20 during use.

The holes 24 in the end bars 21 and 22, through which the rubber rope forming the resilient members passes, are preferably sufficiently large to permit the rubber rope to be threaded therethrough without difficulty, while the holes 25 in the center bar 23, as in Fig. 4, are preferably larger to permit the resilient members 20 to pass readily therethrough, when the position of the center bar 23 is being adjusted.

Figure 6:
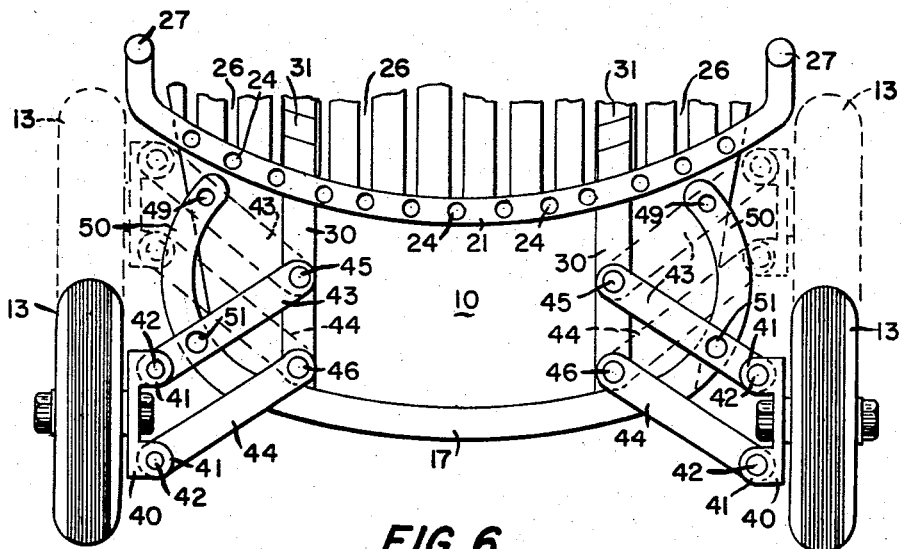
Fig. 6 is a fragmentary end view, on a larger scale, showing the lower portion of the device of Fig. 1 and particularly the manner in which the wheels may be attached thereto.
Figure 7:
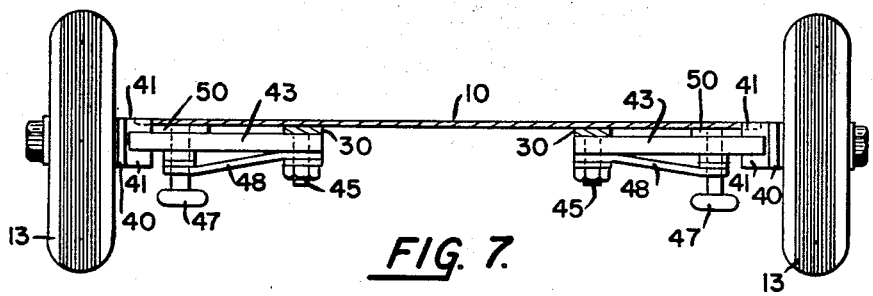
Fig. 7 is a fragmentary top plan view of the portion of the device shown in Fig. 6 with the end of the body shown in section.

As in Figs. 7 and 8, each wheel 13 may be mounted on an axle attached to a bracket 40, each bracket 40 having at both its upper and lower ends a pair of spaced ears 41 adapted to receive a pivot pin 42 for the outer ends, respectively, of an upper link 43 and a lower link 44, the links 43 and 44 being disposed in parallel relation, the inner ends thereof being pivoted on pins 45 and 46, respectively, each mounted on the respective rib 30. Each upper link 45 may be provided with a lock bolt 47, normally pressed inwardly by a leaf spring 48 which extends to pin 45 and normally holds lock bolt 47 inwardly. When adjustment of the position of wheels 13 from the full to the dotted position of Fig. 6 is desired, locking bolt 47 is merely pulled outwardly and the wheel moved upwardly until the lock bolt 47 engages an upper hole 49 in an arcuate segment 50, conveniently formed as an extension of strip 17, it being noted that the lock bolts 47 and springs 48 are omitted in Fig. 6, for clarity of illustration, but that lock bolt 47 extends through a hole 51 in upper link 43 and, with the wheels 13 in the down or full position of Fig. 6, through a corresponding hole in segment 50. As will be evident, due to the spring 48, each lock bolt 47 is securely held in any adjusted position, but is readily pulled outwardly and the corresponding wheel moved upwardly to the cradle or dotted position of Fig. 6.

As in Figs. 1 and 8, the handle H may comprise a cross bar 55 of suitable material, such as plastic, attached between the upper ends of telescoping sides 56, the lower ends of which may be pivoted on a cross bar 57, conveniently tubular and extending through the sides 11, being conveniently welded thereto. Thus, the bar 55 may occupy either the position of Fig. 1 or the position of Fig. 8, the latter of which shows the device in use as a cradle. Handle sides 56 may each extend through guide clip 58, attached to the respective side 11 for holding the handle in a convenient position. As in Fig. 9, each telescoping side of the handle H may include a rod 60 and tubes 61 and 62 of increasing diameter, one fitting within the other and suitable means being provided for holding the telescoping rod and tubes in adjusted position. Although the handle sides may be held in adjusted position in many ways, one manner is shown in Figs. 9 and 10, wherein tube 61 is provided with an upper slot 63 having reentrant transverse ends 64 and 64' and engaged by a pin 65 extending inwardly from tube 62 adjacent the lower end of the latter, and a lower slot 66 having transverse ends 67 and 67' and engaged by a pin 68 extending outwardly from lower rod 60. As will be evident, when the handle is extended, tube 61 may be turned so that pin 65 will move into the upper end 64 of slot 63 and pin 68 will move into the lower end 67' of slot 66. Similarly, when the handle is collapsed, tube 61 may be turned so that pin 65 will move into the lower end 64' of slot 63 and pin 68 will move into the upper end 67 of slot 66. Tube 61 may be provided with a lever 69 for turning the same, between locking positions with the handle in either extended or collapsed positions, and to adjustment positions, wherein the pins 65 and 69 are moved out of the respective ends of the respective slots 63 and 66.

From the foregoing, it will be evident that a device constructed in accordance with this invention fulfills to a marked degree the requirements and objects hereinbefore set forth. The use of light sheet material, such as aluminum or magnesium or alloys thereof, with reinforcing bars and strips, reduces considerably the total weight of the device. The rockers provided on the lower edges of the ends of the body, which also act as reinforcing strips for the ends, permit the device to be used as a cradle, when the wheels are adjusted to the upper position. The wheels also act as a stop to prevent accidental overturning of the cradle, when the device is used as such. The elongated resilient members support the infant in a more comfortable fashion than would a solid bottom, but eliminate a considerable portion of the weight which springs would necessitate. The elongated resilient members also act to hold the end bars and the center bar in adjusted position, while the end bars and the center bars permit the elongated resilient members to lie in a plane, or to extend upwardly at either end. The adjustment of the center bar permits the angularity of the elongated members to be further adjusted. The reinforcing ribs, which are provided with notches engaged by the end bar, not only add strength and rigidity to the construction, but permit the tension members to hold either end bar in adjusted position. When the handle is telescoped and the wheels are moved to up position, the device is readily usable as a cradle and also occupies a minimum of space and thus may be readily placed in a passenger automobile or the like.

Although a preferred embodiment of this invention has been illustrated and described, it will be understood that other embodiments may exist and that various changes may be made, all without departing from the spirit and scope of this invention.

What is claimed is:

1. A device for receiving an infant, comprising a body having sides and ends; a series of longitudinally extending, laterally spaced, elongated resilient members; means for adjusting the vertical position of the ends of said members; and longitudinally adjustable means engaging said members adjacent the center of the body and limiting upward movement of said members at the position of engagement with said means.

2. A device as defined in claim 1, wherein said adjusting means includes a transverse bar at each end of said body and attached to said elongated members, said end bars being vertically adjustable; and said means engaging said members adjacent the center of said body includes a longitudinally adjustable bar extending laterally across said body at a lower position and engaging said elongated resilient members.

3. A device as defined in claim 2, wherein said end bars are bowed downwardly toward the center thereof.

4. A device as defined in claim 2, wherein said center bar is bowed downwardly toward its center.

5. A device as defined in claim 2, wherein each end bar is provided with an upwardly and then endwardly outwardly extending handle portion.

6. A device usable as a cradle for infants, comprising a body having sides and ends formed of sheet material and reinforcing strips along the upper and lower edges thereof, the lower reinforcing strips of said ends being arcuate to provide rockers; each said end having a series of spaced vertical slots therein and each side having a longitudinal slot in a lower position; a reinforcing strip extending longitudinally of each said side and provided with a slot coinciding with the respective longitudinal slot, said reinforcing strip slot having an upper edge provided with notches; a central tubular bar bowed downwardly at the center and provided with handle means at each outer end, said central bar extending through said side slots; a tubular bar bowed downwardly at the center and disposed at each respective end of said body, each said end bar being provided with an upwardly and endwardly outwardly extending handle portion at each end; a series of resilient members extending between said end bars and through said central bar and said vertical slots, said end bars having holes to receive said members and said central bar having holes of sufficient diameter to permit said central bar to be adjusted longitudinally with said resilient members passing therethrough; and a pair of vertical reinforcing ribs attached to each end of said body in spaced relation and provided with slanting, arcuate notches for engaging the respective end bar.

7. A device for receiving an infant, comprising a body having sides and ends; a series of longitudinally extending, laterally spaced, elongated resilient members; a transverse bar at each end of said body on the outside thereof and attached to said elongated members, said end bars being vertically adjustable and each end of said body being provided with a series of vertical slots through which said elongated members extend; and a longitudinally adjustable bar extending laterally across said body at a lower position and engaging said elongated resilient members.

8. A device as defined in claim 7, including spaced reinforcing members extending vertically on the outside of each end of said body and provided with notches for engaging the respective end bar.

9. A device for receiving an infant, comprising a body having sides and ends; a series of longitudinally extending, laterally spaced, elongated resilient members; a transverse bar at each end of said body and attached to said elongated members, said end bars being vertically adjustable; a longitudinally adjustable bar extending laterally across said body at a lower position and engaging said elongated resilient members, each side of said body being provided with a longitudinally extending slot at a lower position, through which said center bar extends; and means provided with notches for engaging said center bar to hold said center bar in adjusted position.

10. A device as defined in claim 9, wherein each end of said longitudinally adjustable bar is provided with a transversely extending handle portion.

References Cited in the file of this patent

UNITED STATES PATENTS

| 198,892 | Magers | Jan. 1, 1878 |
| 255,322 | Myers | Mar. 21, 1882 |
| 460,800 | Leonhard | Oct. 6, 1891 |
| 959,741 | Comstock | July 9, 1907 |
| 984,001 | Ingraham | Feb. 14, 1911 |
| 1,423,065 | Arnold | July 18, 1922 |
| 2,106,927 | Kinnear | Feb. 1, 1938 |
| 2,293,560 | Price | Aug. 18, 1942 |
| 2,461,609 | Light | Feb. 15, 1949 |
| 2,595,321 | Anderson | May 6, 1952 |
| 2,625,982 | Bulmash et al. | Jan. 20, 1953 |